(12) United States Patent
Yoshida et al.

(10) Patent No.: US 8,488,264 B2
(45) Date of Patent: Jul. 16, 2013

(54) MAGNETIC DISK DEVICE, SIGNAL PROCESSING CIRCUIT, AND SIGNAL PROCESSING METHOD

(75) Inventors: Kenji Yoshida, Akishima (JP); Akihiro Yamazaki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 13/237,757

(22) Filed: Sep. 20, 2011

(65) Prior Publication Data

US 2012/0134044 A1 May 31, 2012

(30) Foreign Application Priority Data

Nov. 30, 2010 (JP) ................................. 2010-267491

(51) Int. Cl.
*G11B 5/09* (2006.01)
(52) U.S. Cl.
USPC .............................................. 360/51; 360/48
(58) Field of Classification Search
None
See application file for complete search history.

(56) References Cited

FOREIGN PATENT DOCUMENTS

| JP | 07-147059 | 6/1995 |
|---|---|---|
| JP | 07-211006 | 8/1995 |
| JP | 08-031120 | 2/1996 |
| JP | 08-180601 | 7/1996 |
| JP | 09-035202 | 2/1997 |
| JP | 2000-048500 | 2/2000 |
| JP | 2004-213896 | 7/2004 |
| JP | 2004-253042 | 9/2004 |
| JP | 2005-339786 | 12/2005 |
| JP | 2007-026639 | 2/2007 |
| JP | 2007-073091 | 3/2007 |
| JP | 2009-004056 | 1/2009 |
| JP | 2009-218976 | 9/2009 |
| WO | WO-2009/016683 | 2/2009 |

OTHER PUBLICATIONS

Japanese Office Action dated Apr. 10, 2012, filed in Japanese counterpart Application No. 2010-267491, 7 pages (with English translation).

Masaaki Fujii, et al. "Iterative ITI Canceller for Shingled Write Recording", 2010 Institute of Electronics, Information and Communication Engineers Electronics Society Convention, Sep. 14-17, 2010, p. 21.

*Primary Examiner* — Regina N Holder
(74) *Attorney, Agent, or Firm* — Patterson & Sheridan, LLP

(57) ABSTRACT

According to one embodiment, a signal processing circuit processes a signal read from a magnetic disk including a servo region and a user data region, the servo region including a servo address mark, the user data region including a data sector, and includes a counter and a gate controller. The counter is configured to count a first clock when having detected the servo address mark based on the signal read from the magnetic disk. The gate controller is configured to generate a pulse for locating the data sector in synchronization with a second clock when the counter counts a first value.

7 Claims, 5 Drawing Sheets

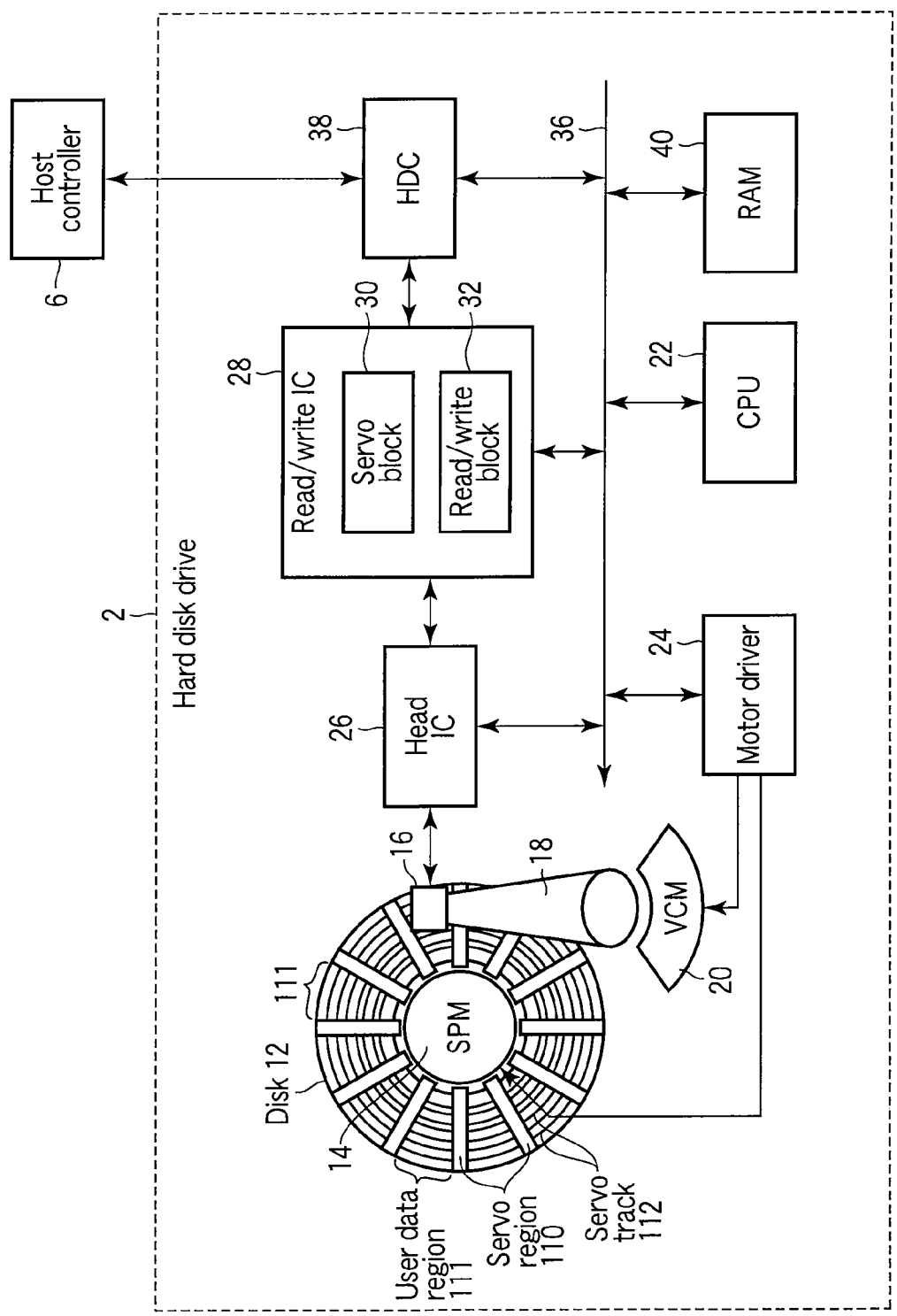
F I G. 1

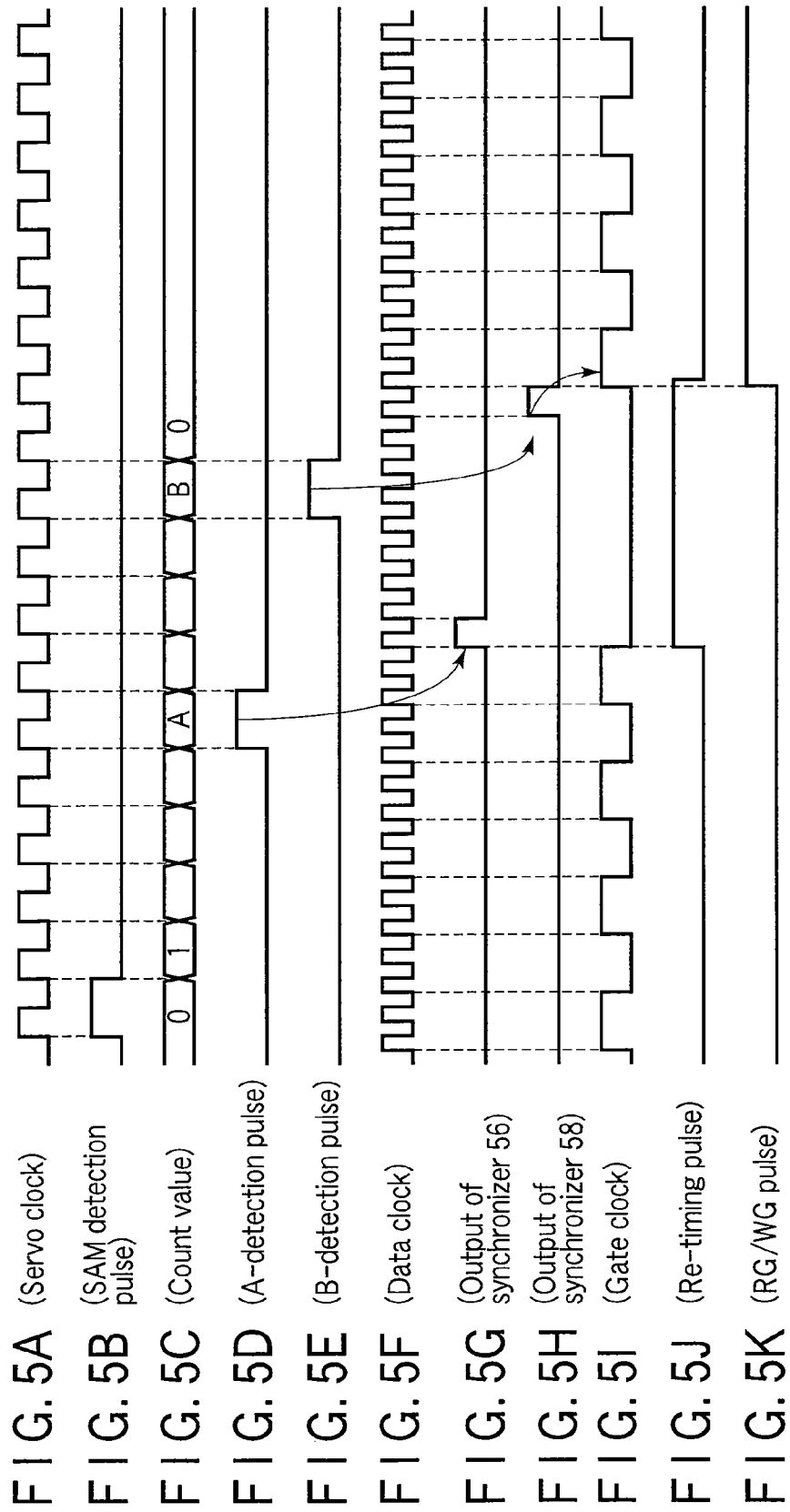

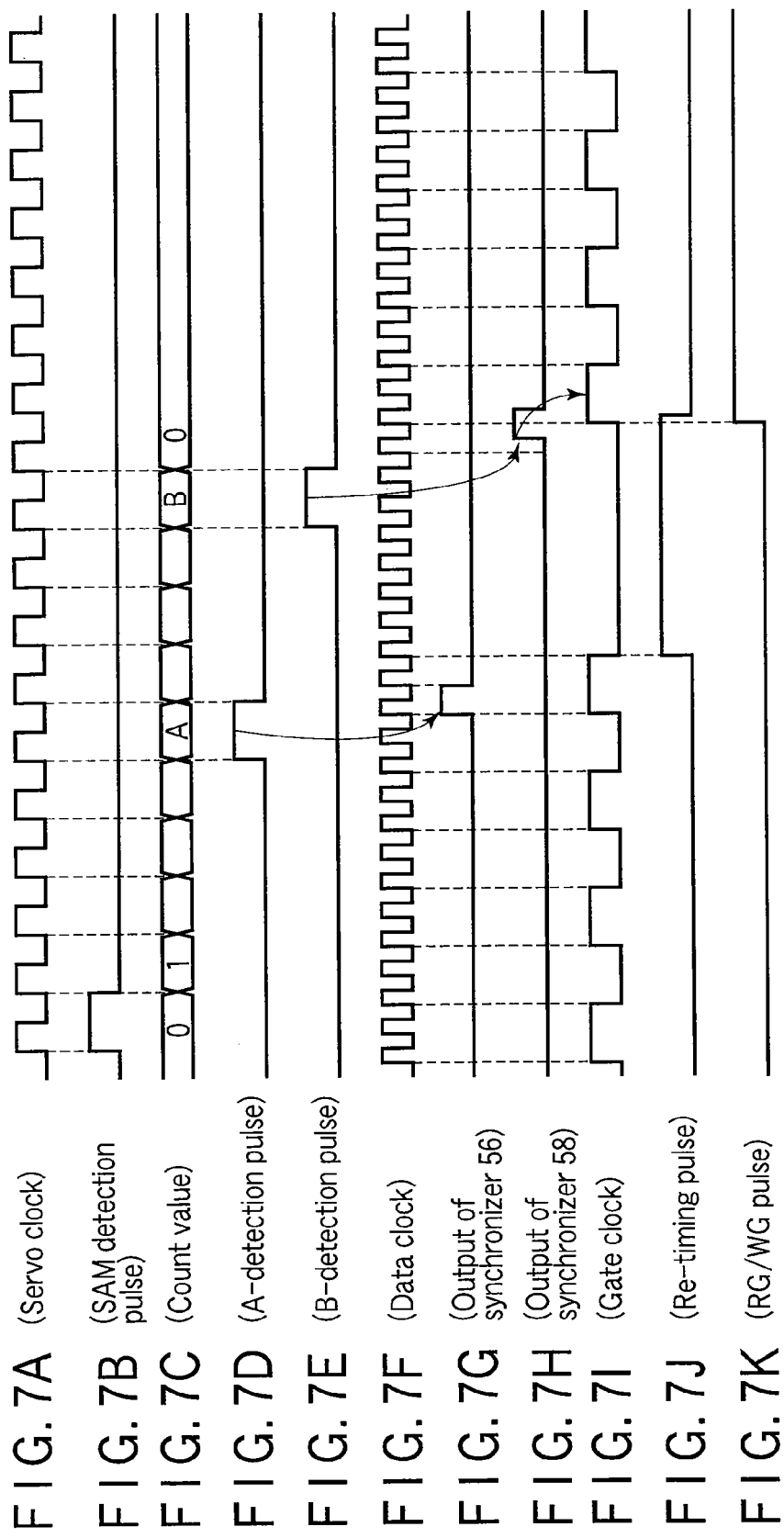

US 8,488,264 B2

MAGNETIC DISK DEVICE, SIGNAL PROCESSING CIRCUIT, AND SIGNAL PROCESSING METHOD

CROSS-REFERENCE TO RELATED APPLICATIONS

This application is based upon and claims the benefit of priority from Japanese Patent Application No. 2010-267491, filed Nov. 30, 2010; the entire contents of which are incorporated herein by reference.

FIELD

Embodiments described herein relate generally to a magnetic disk device, a signal processing circuit, and a signal processing method.

BACKGROUND

In recent years, magnetic disk devices, including hard disk drives, have been strongly required to have much higher capacity than before. A shingled write recording method has been attracting attention as one solution. In this method, in a write operation, the track pitch is narrowed and data is written so as to overwrite a part of an adjacent track. When the track pitch gets narrower than a specific value as the result of an increase in overlapping, the leakage of magnetic field from adjacent tracks (i.e., inter-track interference) in a read operation becomes too large and therefore the quality of the reproduced signal deteriorates significantly. To alleviate the inter-track interference, a reproduction technique for using signal information on adjacent tracks as noise-canceling information in reproducing the present track has been proposed (e.g., Masaaki Fujii, "Iterative ITI Canceller for Shingled Write Recording," presented at the 2010 Institute of Electronics, Information and Communication Engineers Electronics Society Convention).

With this technique, it is necessary to subtract information for canceling inter-track interference obtained from adjacent track information from information on the present track. To subtract the former from the latter properly, subtraction has to be done after the bit positions of an adjacent track are aligned with those of the present track.

However, in magnetic disk devices before the advent of the shingled write recording method, there was a large difference in bit position between a track and an adjacent track. It was difficult to align the bit positions of the preceding track with those of the present track.

In the conventional magnetic disk device, there is a difference in bit position between a track and an adjacent track.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary circuit diagram showing an example of the configuration of a magnetic disk device according to an embodiment.

FIGS. 5A, 5B, 5C, 5D, 5E, 5F, 5G, 5H, 5I, 5J, and 5K are exemplary timing charts to explain an example of the operation of the main part of the read/write block in FIG. 1.

FIGS. 7A, 7B, 7C, 7D, 7E, 7F, 7G, 7H, 7I, 7J, and 7K are exemplary timing charts to explain an example of the operation of the main part of the read/write block when the synchronizer of FIG. 6 is used.

DETAILED DESCRIPTION

Figure 2:
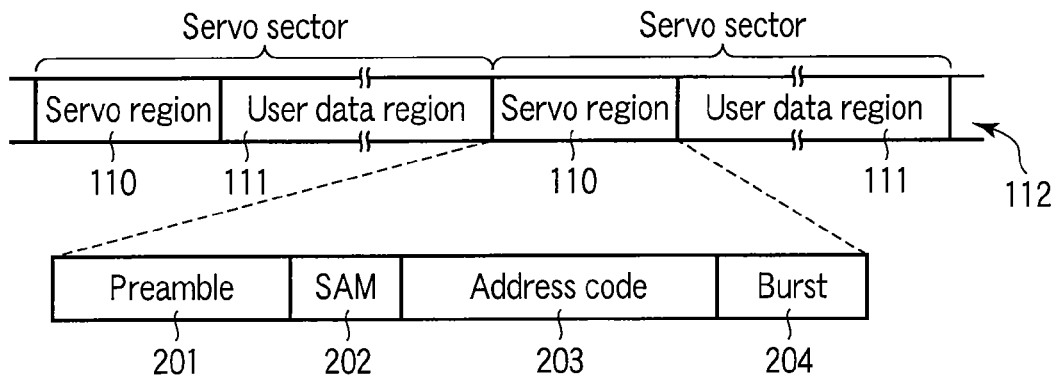
FIG. 2 shows an exemplary format of a servo track applied to the embodiment and an exemplary format of servo data written in each servo region on the servo track.

Various embodiments will be described hereinafter with reference to the accompanying drawings.

In general, according to one embodiment, a signal processing circuit processes a signal read from a magnetic disk including a servo region and a user data region, the servo region including a servo address mark, the user data region including a data sector, and includes a counter and a gate controller. The counter is configured to count a first clock when having detected the servo address mark based on the signal read from the magnetic disk. The gate controller is configured to generate a pulse for locating the data sector in synchronization with a second clock when the counter counts a first value.

FIG. 1 shows a circuit configuration of a hard disk drive (HDD) 2 according to an embodiment. The hard disk drive 2 is a recording device for writing data (including error-correction coded data) to the recording surface of a recording medium (magnetic disk) 12 according to a request from a host controller 6 serving as a host system or reading data from the recording surface.

On each recording surface of the disk 12, a plurality of servo regions 110 are arranged at equal intervals circumferentially, each extending in the direction of radius of the disk 12. A part between adjacent servo regions 110 on the recording surface of the disk 12 is allocated to a user data region 111. On each recording surface of the disk 12, a plurality of concentric servo tracks 112 are arranged. In each servo region 110, servo data is written (embedded) in each servo track 112 in advance. For convenience of drawing, FIG. 1 shows a case where the number N of servo regions 110 is 12. However, in the case of a 2.5-inch HDD, N is about 300.

FIG. 2 shows a format of the servo track 112 and a format of servo data written in each servo region 110 on the servo track 112.

A servo region 110 and a user data region 111 following the servo region 110 on the servo track 112 constitute a servo sector. In the user data region 111, there are provided a plurality of data sectors.

Servo data written in the servo region 110 includes a preamble 201, a servo address mark (SAM) 202, an address code 203, and burst data 204.

The preamble 201 includes a signal of a specific frequency. The preamble 201 is used in a phase-locked loop (PLL) process of synchronizing a servo data reproducing clock (servo clock) with time-lag caused by a variation in the rotational speed of the disk 12 or the like and an automatic gain control (AGC) process of stabilizing the amplitude of a signal. The servo address mark (SAM) 202 is a specific code (bit pattern signal) for identifying corresponding servo data (servo region 110).

The address code 203 includes a cylinder address (cylinder number) and a sector address (sector number). The cylinder address indicates a cylinder (track) position on the disk 12 in which corresponding servo data has been written. The sector address indicates the number of the servo region 110 in which corresponding servo data has been written in the arrangement of servo regions 110 in the same cylinder (track). The burst data 204 is a burst signal that indicates information on the relative position of a head in the cylinder in which the corresponding servo data has been written. The address code 203 (a cylinder code therein) and burst data 204 are position information used for positioning the head 16 in a target position on the disk 12.

In FIG. 1, the disk 12 is fixed to a spindle motor (SPM) 14. The spindle motor 14 is driven, thereby rotating the disk at a specific speed. For example, one disk surface of the disk 12 is a recording surface on which data is recorded magnetically. The head (magnetic head) 16 is arranged so as to correspond to the recording surface of the disk 12. The head 16 is fixed to one end of an actuator 18. The other end of the actuator 18 is fixed to a voice coil motor (VCM) 20. The voice coil motor 20 is driven, causing the head 16 to move over the range overlapping with the surface of the disk 12 in the arc trajectory centering on the shaft of the voice coil motor 20.

In the configuration of FIG. 1, it is assumed that a hard disk drive 2 with a single disk 12 is used. However, a plurality of disks 12 may be fixed to the spindle motor 14, with the disks spaced a specific distance apart. In this case, a plurality of actuators 18 are fixed to the voice coil motor 20 in such a manner that they are stacked one on top of another so as to fit in the clearance between the disks 12. A head 16 is secured to one end of each of the actuators 18. Therefore, when the spindle motor 14 is driven, all the disks 12 are rotated at the same time, driving the voice coil motor 20, which then causes all the heads 16 to move simultaneously. In the configuration of FIG. 1, one face of the disk 12 makes a recording surface. However, both faces of the disk 12 may make recording surfaces and a head 16 may be arranged so as to correspond to either recording surface.

The CPU 22 functions as a main controller of the hard disk drive 2. The CPU 22 performs control via a motor driver 24 to start and stop the spindle motor 14 and maintain its rotational speed. The CPU 22 also performs drive control of the voice coil motor 20 via the motor driver 24, thereby moving the head 16 to a target track and performing control to set the head 16 in a range targeted by the track.

The head 16 is positioned in a steady rotation state after the start-up of the spindle motor 14. As described with reference to FIG. 2, the servo regions 110 are arranged at equal intervals in the direction of circumference of the disk 12. Therefore, in an analog signal read by the head 16 from the disk 12 and amplified by a head IC 26, a servo signal recorded in the servo regions appears at equal intervals of time. A servo block 30 included in a read/write IC 28 processes the analog signal making use of this state, thereby generating a signal for positioning the head 16. Based on this signal, the CPU 22 controls the motor driver 24, thereby causing the motor driver 24 to supply a current (VCM current) for positioning the head 16 to the voice coil motor 20 in real time.

The CPU 22 not only controls the spindle motor 14 and voice coil motor 20 via the motor driver 24 as described above, but also controls other elements of the hard disk drive 2 and carries out a command process. The CPU 22 includes a ROM that stores firmware. The CPU 22 is connected to a CPU bus 36.

A motor driver 24, a head IC 26, a read/write IC 28, a disk controller (HDC) 38, and a RAM 40 are connected to the CPU bus 36. The RAM 40 is used to store various variables used by, for example, the CPU 22. A part of the storage area of the RAM 40 is used as a work area of the CPU 22.

The read/write IC 28 includes a servo block 30 and a read/write block 32. The servo block 30 carries out a signal process necessary to position the head 16 (including the extraction of a servo signal). The read/write block 32 carries out a signal process for reading and writing data (including an error correction encoding and decoding process).

The hard disk controller 38 is connected not only to the CPU bus 36 but also to the read/write IC 28. The hard disk controller 38 has a host interface control function of receiving a command (e.g., a write command or a read command) transferred from the host controller 6 and controlling data transfer between the host and hard disk controller 38.

Each of the read/write IC 28 and the hard disk controller 38 includes control registers. A part of the memory space of the CPU 22 is allocated to the control registers. The CPU 22 accesses the part of the memory space, thereby controlling the read/write IC 28 or hard disk controller 38 via the control registers.

Figure 3:
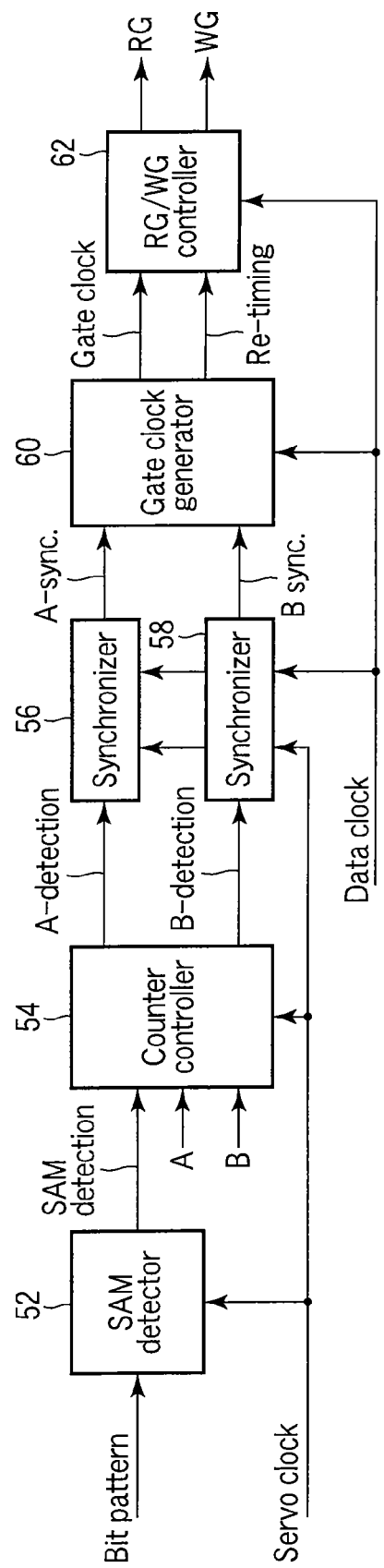
FIG. 3 is an exemplary circuit diagram showing a configuration of the main part of the read/write block in FIG. 1.

FIG. 3 shows a configuration of the main part of a reproduced signal processing circuit in the read/write block 32. An analog signal read from the disk 12 by the head 16 and amplified by the head IC 26 is A/D converted and the resulting signal passes through a waveform equalizer circuit and a Viterbi decoder (which are not shown), producing a bit pattern. The bit pattern is input to a servo address mark (SAM) detector 52. The SAM detector 52 operates based on a servo clock. When having detected a servo address mark written in the servo region 110, the SAM detector 52 outputs a SAM-detection pulse. Therefore, the SAM-detection pulse synchronizes with the servo clock. The SAM-detection pulse is input to a counter controller 54. The servo clock, which is a clock for reading servo information, is normally set to a specific frequency, regardless of the inner or outer circumference.

Not only the servo clock but also specific count values A, B are also input to the counter controller 54. Count values A, B are set in firmware. As described later, the count value A indicates the timing of a retiming pulse and the count value B indicates the start position of a user data region controlled as a relative distance (position) from the servo address mark. When a SAM-detection pulse has been input to the counter controller 54, the controller 54 starts to count the servo clock. When the count value coincides with the specific count value A or B, the counter controller 54 outputs an A-detection pulse or a B-detection pulse. Both the A-detection pulse and B-detection pulse synchronize with the servo clock. The A-detection pulse and B-detection pulse are input to the synchronizers 56, 58, respectively.

Both the servo clock and a data clock are also input to the synchronizers 56, 58. The data clock is a clock for reading user data recorded on the disk 12 (or for writing user data onto the disk 12). The data clock is set to a frequency coinciding with the bit transfer rate of data. Therefore, the data clock is not a constant frequency and normally set lower on the inner peripheral side and higher on the outer peripheral side. The servo clock and the data clock do not synchronize with each other. The A-detection pulse and B-detection pulse synchronized with the servo clock are input to the synchronizers 56, 58, the synchronizers 56, 58 output an A-synchronization pulse and a B-synchronization pulse which synchronize with the data clock. The A-synchronization pulse and B-synchronization pulse are input to a gate clock generator 60. The data clock is also input to the gate clock generator 60.

The gate clock generator 60 outputs a gate clock in synchronization with the data clock, and a retiming pulse with specific timing. In this example, the gate clock generator 60 generates the gate clock by frequency-dividing the data clock.

The gate clock generator 60 stops the output of the gate clock once after the output timing of the SAM-detection pulse and resumes the output of the gate clock immediately after the output timing of the B-synchronization pulse. The retiming pulse is brought to "1" level after the output of the gate clock is stopped once and then brought to "0" level after the output of the gate clock is resumed. The gate clock is supplied to a RG/WG controller 62 for controlling a read gate (RG)/write gate (WG).

The RG/WG controller 62 generates a read gate (RG) pulse or a write gate (WG) pulse according to the gate clock and retiming pulse. Specifically, when the retiming pulse is at "1" level, the RG/WG controller 62 generates an RG pulse or a WG pulse for opening the read gate or write gate at the rising edge of the gate clock and supplies the generated pulse to the following read gate or write gate. The period during which the read gate or write gate is open is a read period or a write period.

Figure 4:
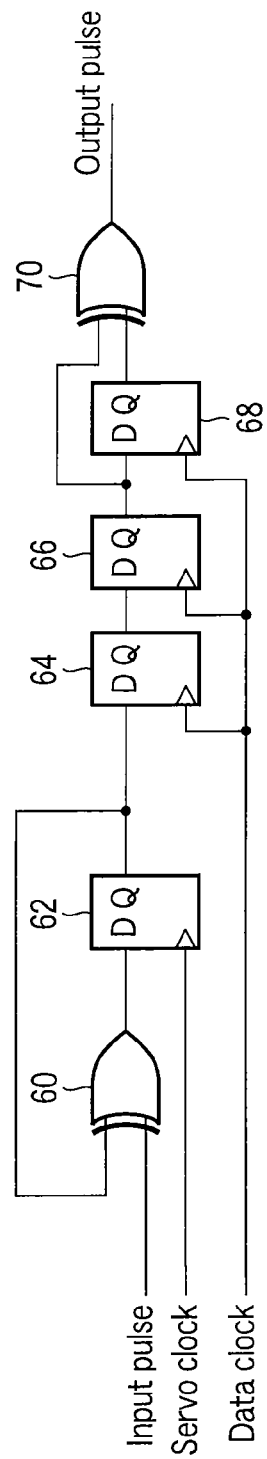
FIG. 4 is an exemplary circuit diagram showing a configuration of the synchronizers in FIG. 3.

FIG. 4 shows a configuration of the synchronizers 56, 58. An input pulse (the A-detection pulse or B-detection pulse output from the counter controller 54) is input to a first input terminal of an EX-OR gate 60. An output signal of the EX-OR gate 60 is input to a D input terminal of a D-type flip-flop 62. The servo clock is input to a clock input terminal of the D-type flip-flop 62. The output (Q output) of the D-type flip-flop 62 not only is fed back to a second input terminal of the EX-OR gate 60 but also passes through D-type flip-flops 64, 66, 68 in series and is supplied to a first input terminal of an EX-OR gate 70. The data clock is supplied to the clock terminals of the D-type flip-flops 64, 66, 68. The output of the D-type flip-flop 66 is input to a second input terminal of the EX-OR gate 70. The output pulse of the EX-OR gate 70 is a synchronization pulse output from each of the synchronizers 56, 58.

As described above, the input pulses (A- and B-detection pulses) synchronized with the servo clock are input to the synchronizers 56, 58. Each of the synchronizers 56, 58 not only delays the input pulse by causing the pulse to pass through the D-type flip-flops 62, 64, 68 but also adjusts the timing of the input pulse so as to synchronize with the data clock. Therefore, the synchronizers 56, 58 synchronize the A- and B-detection pulses for one period of servo clock with the data clock respectively and outputs output pulses (A- and B-synchronization pulses) for one period of data clock.

The operation of the main part of the reproduced signal processing circuit in the read/write block 32 shown in FIGS. 3 and 4 will be explained with reference to timing charts of FIGS. 5A to 5K. The processing circuit is configured to perform control using a relative position (distance) from the servo address mark as the start position of the user data region to minimize the difference in bit position between a track and an adjacent track.

FIGS. 5A and 5F show the servo clock and data clock, respectively. As described above, these two clocks are separate clocks and do not synchronize with each other. In the embodiment, the servo clock is lower in frequency than the data clock. However, they are not limited to this and the frequency of the servo clock may be higher than that of the data clock.

The bit pattern output from the head IC 26 is input to the SAM detector 52. The servo address mark includes a specific bit pattern not included in the other marks. Therefore, when the servo gate is opened, the SAM detector 52 determines whether the input bit pattern coincides with the specific bit pattern. When having determined that the input bit pattern coincides with the specific bit pattern, the SAM detector 52 outputs the SAM-detection pulse as shown in FIG. 5B. In the embodiment, the SAM detector 52 operates in synchronization with the servo clock and therefore the pulse width of the SAM-detection pulse is equivalent to one period of servo clock. However, the SAM-detection pulse may be out of synchronization with the servo clock. Even when the SAM-detection pulse is in synchronization with the servo clock, it may synchronize only with the rising edge or falling edge of the servo clock and the pulse width may be longer than one period.

When the SAM-detection pulse has been input to the counter controller 54, the circuit 54 starts to count the servo clock. In this example, since the SAM-detection pulse synchronizes with the servo clock, the counter controller 54 counts the servo clock, starting with the falling edge of the SAM-detection pulse as shown in FIG. 5C. When the count value has coincided with the specific count value A or B, the counter controller 54 outputs the A-detection pulse or B-detection pulse shown in FIGS. 5D and 5E, respectively. In the embodiment, both the A-detection pulse and B-detection pulse synchronize with the servo clock and the pulse width of the A-detection pulse and B-detection pulse is equivalent to one period of the servo clock.

The synchronizer 56 to which the A-detection pulse is input outputs the synchronization pulse by synchronizing the rising edge of the A-detection pulse with the rising edge of the data clock as shown in FIG. 5G. Although the pulse width of the synchronization pulse is made equal to one period of the data clock, it is not limited to this. The rising edge of the synchronization pulse has only to synchronize with the rising edge of the data clock and the pulse width may be equal to several periods of the data clock. Similarly, the synchronizer 58 to which the B-detection pulse is input outputs the synchronization pulse equivalent to one period of the data clock by synchronizing the rising edge of the B-detection pulse with the rising edge of the data clock as shown in FIG. 5H.

The gate clock generator 60 outputs a gate clock for controlling the subsequent read gate and write gate in synchronization with the data clock. In this example, the gate clock generator 60 frequency-divides the data clock of FIG. 5F in half, thereby generating the gate clock shown in FIG. 5I. Since the gate clock is not needed during the time from when the SAM-detection pulse is generated until the pulse reaches the start position of the user data region, the gate clock is stopped at a specific timing. In the embodiment, the gate clock generator 60 stops the gate clock (maintains "0" level) as shown in FIG. 5I in response to the A-synchronization pulse (FIG. 5G) (at the rising edge). However, after the generation of the SAM-detection pulse, the gate clock may be stopped after a specific number of clocks (toggles). In addition, the gate clock may be stopped in response to the falling edge of the SAM-detection pulse. The timing of stopping the gate clock has only to be before the B-detection pulse is generated as a result of the count value of the counter controller 54 coinciding with B.

The gate clock generator 60 outputs the retiming pulse with specific timing. The retiming pulse is configured to generate an RG pulse or a WG pulse for the RG/WG controller 62 to open the read gate or the write gate at the rising edge of the gate clock when the retiming pulse is at "1" level. Therefore, the gate clock generator 60 has to output (or set to "1" level) the retiming pulse before the B-synchronization pulse. In this example, the gate clock generator 60 outputs the retiming pulse in response to the stopping of the gate clock as shown in FIG. 5J.

When the B-synchronization pulse (FIG. 5H) has been generated, the gate clock generator 60 resumes the gate clock at the rising edge of the B-synchronization pulse as shown in FIG. 5I. Since the retiming pulse is at "1" level as shown in FIG. 5J when the gate clock is resumed, the RG/WG controller 62 outputs the RG pulse or WG pulse as shown in FIG. 5K at the rising edge of the resumed gate clock.

Figure 6:
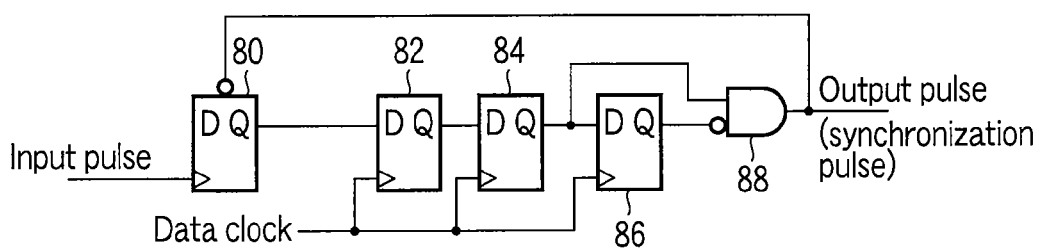
FIG. 6 is an exemplary circuit diagram showing another configuration of the synchronizers in FIG. 3.

The synchronizers 56, 58 are not limited to the configuration of FIG. 4 and may use various configurations. For example, FIG. 6 shows another configuration of the synchronizers 56, 58. An input pulse (the A-detection pulse or B-detection pulse output from the counter controller 54) is input to the clock input terminal of a D-type flip-flop 80. The output (Q output) of the D-type flip-flop 80 passes through D-type flip-flops 82, 84, 86 in series and is input to a first input terminal (an inverting input terminal) of an AND gate 88. The data clock is supplied to the clock terminal of each of the D-type flip-flops 82, 84, 86. The output of the D-type flip-flop 84 is input to a second input terminal of the AND gate 88. An output pulse from the AND gate 88 makes the synchronization pulse output from each of the synchronizers 56, 58.

The operation of the main part of the reproduced signal processing circuit in the read/write block 32 shown in FIGS. 3 and 4 when the synchronizer of FIG. 6 is used will be explained with reference to timing charts of FIGS. 7A to 7K.

The operation of a servo clock domain is the same as that of FIGS. 5A to 5K. Therefore, FIGS. 7A, 7B, 7C, 7D, 7E are the same as FIGS. 5A, 5B, 5C, 5D, 5E. The data clock shown in FIG. 7F is the same as that of FIG. 5F.

As shown in FIG. 7G, the synchronizer 56 to which the A-detection pulse is input synchronizes the rising edge of the A-detection pulse with the rising edge of the data clock, thereby outputting the synchronization pulse. The timing of outputting the synchronization pulse is one cycle of the data clock earlier than that of FIG. 5G.

As shown in FIG. 7H, the synchronizer 58 to which the B-detection pulse is input synchronizes the rising edge of the B-detection pulse with the rising edge of the data clock, thereby outputting the synchronization pulse. The timing of outputting the synchronization pulse is one cycle of the data clock earlier than that of FIG. 5H.

After the A-synchronization pulse (FIG. 7G), the gate clock generator 60 stops the gate clock as shown in FIG. 7I (maintaining "0" level after the falling edge). As in FIG. 5G, the stopping of the gate clock has only to be before the B-detection pulse is generated as a result of the count value of the counter controller 54 coinciding with B.

The gate clock generator 60 outputs the retiming pulse in response to the stopping of the gate clock as shown in FIG. 7J.

When the B-synchronization pulse (FIG. 7H) has been generated, the gate clock generator 60 resumes the gate clock at the falling edge as shown in FIG. 7I. Since the retiming pulse is at "1" level as shown in FIG. 7J when the gate clock is resumed, the RG/WG controller 62 outputs the RG pulse or WG pulse as shown in FIG. 7K at the rising edge of the resumed gate clock.

As described above, with the embodiment, in a write operation, the counter controller 54 in synchronization with the servo clock searches for a servo address mark. When having detected the servo address mark, the counter controllers 54 starts to count. When the count value has reached the first specific value A, a pulse in the servo clock domain is generated and synchronized with the data clock, thereby producing a pulse in the data clock domain. After this pulse has been generated, the toggling of the gate clock is stopped (maintaining the gate clock at "0" level). At the same time, the retiming pulse is set to "1" level.

When the count value has reached the second specific value B, a pulse in the servo clock domain is generated. Then, the pulse is synchronized with the data clock, thereby producing a pulse in the data clock domain. When the pulse in the data clock domain has been received, the toggling of the gate clock is resumed (forming the rising edge).

Since the retiming pulse is at "1" level, the WG pulse is produced at the rising edge of the gate clock. The rising edge of the WG pulse is used as a reference position of the write start of user data. A counter (not shown) synchronized with the gate clock at the reference position determines a sync mark write position. After a sync mark has been written, a user data pattern is recorded.

By performing the above control, the write beginning position of the user data pattern is as follows: "the count value A in the servo clock domain"+"the sync mark write position in the servo clock domain"+"uncertainty in synchronization by the synchronizer (=one period of data clock)," counted from the servo address mark.

That is, the control difference in the write beginning position of the user data pattern can be suppressed only to the uncertainty of synchronization. Therefore, the write gate position and user data pattern write position can be controlled at very high accuracy. As a result, a relative start position of the user data pattern can be controlled to a difference less than one period of the data clock between one track and an adjacent one. Furthermore, in the shingled write recording method, it is easier to make position adjustment between one track and an adjacent one in order to cancel interference. This enables inter-track interference to be canceled with a high degree of accuracy, making it possible to make the track pitch narrower, which enables high-density recording.

Since the data sector start position is controlled based on the number of servo clocks, the count value B which is the reference position of the write start of user data remains unchanged, regardless of whether the position is close to the inner or outer peripheral side, and therefore the value need not be changed zone by zone.

While in the explanation, the timing of stopping the toggling of the gate clock has been set as the timing of detecting the count value B, the toggling may be stopped when the SAM has been detected, when the servo gate is opened, or when the toggling has been performed a specific number of times after the detection of the SAM.

While in the explanation, the position at which the write gate or the read gate generates a signal has been controlled based on the timing of detecting the count value B, the position may be controlled based on the timing of detecting the count value A.

In addition, the count value A in a read operation may be made different from that in a write operation.

Furthermore, while the servo clock has been assumed to be a clock for demodulating the servo data, it may be a clock obtained by frequency-dividing the clock for demodulating the servo data. Similarly, although the data clock has been assumed to be a clock for writing/reading the user data, it may be a clock obtained by frequency-dividing the clock for writing/reading the user data.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without depart-

What is claimed is:

1. A signal processing circuit which processes a signal read from a magnetic disk comprising a servo region and a user data region, the servo region comprising a servo address mark, the user data region comprising a data sector, the circuit comprising:
   a counter configured to count a servo clock when having detected the servo address mark based on the signal read from the magnetic disk and to output a first detection pulse in synchronization with the servo clock when having detected a first value;
   a gate controller configured to generate a pulse for locating the data sector in synchronization with a data clock which is not in synchronization with the servo clock when the counter outputs the first detection pulse; and
   a gate clock generator configured to generate a gate clock in synchronization with the data clock,
   wherein the gate clock generator is configured to stop generating the gate clock when the counter counts a second value smaller than the first value and to resume generating the gate clock when the counter counts the first value.

2. The circuit of claim 1, wherein the counter is configured to output a second detection pulse when having detected the second value,
   wherein the circuit further comprises:
   a synchronizer configured to receive the first detection pulse and the second detection pulse and to output a first synchronization pulse and a second synchronization pulse both synchronized with the data clock,
   wherein the gate clock generator is configured to stop generating the gate clock in synchronization with the second synchronization pulse and to resume generating the gate clock in synchronization with the first synchronization pulse.

3. The circuit of claim 2, wherein the gate clock generator is configured to generate a retiming pulse by a timing of resuming generating the gate clock, to maintain a level of the retiming pulse at "1" level, and to set the level of the retiming pulse to "0" level after resuming generating the gate clock.

4. A magnetic disk device comprising:
   a magnetic disk comprising a servo region and a user data region wherein the servo region comprises a servo address mark and the user data region comprises a data sector;
   a head configured to write a signal onto the magnetic disk and to read a signal from the magnetic disk; and
   a signal processor configured to process the signal read from the magnetic disk via the head and the signal to be written onto the magnetic disk via the head, wherein the processor comprises:
   a counter configured to count a servo clock when having detected the servo address mark based on the signal read from the magnetic disk and to output a first detection pulse in synchronization with the servo clock when having detected a first value;
   a gate controller configured to generate a pulse for locating the data sector in synchronization with a data clock which is not in synchronization with the servo clock when the counter outputs the first detection pulse; and
   a gate clock generator configured to generate a gate clock in synchronization with the data clock,
   wherein the gate clock generator is configured to stop generating the gate clock when the counter counts a second value smaller than the first value and to resume generating the gate clock when the counter counts the first value.

5. The device of claim 4, wherein the counter is configured to output a second detection pulse when having detected the second value,
   wherein the processor further comprises:
   a synchronizer configured to receive the first detection pulse and the second detection pulse and to output a first synchronization pulse and a second synchronization pulse both synchronized with the data clock,
   wherein the gate clock generator is configured to stop generating the gate clock in synchronization with the second synchronization pulse and to resume generating the gate clock in synchronization with the first synchronization pulse.

6. The device of claim 5, wherein the gate clock generator is configured to generate a retiming pulse by a timing of resuming generating the gate clock, to maintain a level of the retiming pulse at "1" level, and to set the level of the retiming pulse to "0" level after resuming generating the gate clock.

7. A signal processing method of processing a signal read from a magnetic disk comprising a servo region and a user data region, the servo region comprising a servo address mark, the user data region comprising a data sector, the method comprising:
   counting a servo clock when having detected the servo address mark based on the signal read from the magnetic disk;
   outputting a first detection pulse in synchronization with the servo clock when having detected a first value;
   generating a pulse for locating the data sector in synchronization with a data clock which is not in synchronization with the servo clock when having output first detection pulse;
   generate a gate clock in synchronization with the data clock; and
   stopping generating the gate clock when the count value reaches a second value smaller than the first value and resuming generating the gate clock when the count value reaches the first value.

* * * * *